(12) United States Patent
Okunaka et al.

(10) Patent No.: US 11,673,338 B2
(45) Date of Patent: Jun. 13, 2023

(54) THREE DIMENSIONAL SHAPING METHOD AND THREE DIMENSIONAL SHAPING APPARATUS

(71) Applicant: HONDA MOTOR CO., LTD., Tokyo (JP)

(72) Inventors: Tatsuya Okunaka, Wako (JP); Haruka Ito, Wako (JP); Fumitomo Takano, Wako (JP); Mai Yokoi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/533,157

(22) Filed: Nov. 23, 2021

(65) Prior Publication Data

US 2022/0161503 A1    May 26, 2022

(30) Foreign Application Priority Data

Nov. 25, 2020  (JP) .............................. JP2020-194970

(51) Int. Cl.
*B29C 64/393*     (2017.01)
*B29C 64/118*     (2017.01)
*B33Y 50/02*      (2015.01)
*B33Y 10/00*      (2015.01)
*B33Y 30/00*      (2015.01)
*B29C 64/364*     (2017.01)
*B29C 64/20*      (2017.01)
(Continued)

(52) U.S. Cl.
CPC .......... *B29C 64/393* (2017.08); *B29C 64/118* (2017.08); *B29C 64/364* (2017.08); *B33Y 10/00* (2014.12); *B33Y 30/00* (2014.12); *B33Y 50/02* (2014.12); *B29C 64/20* (2017.08); *B29C 64/25* (2017.08); *B33Y 40/00* (2014.12)

(58) Field of Classification Search
CPC ....... B29C 64/393; B29C 64/25; B29C 64/20; B29C 64/364; B29C 64/118; B33Y 10/00; B33Y 30/00; B33Y 40/00; B33Y 50/02
USPC ......................................................... 264/40.1
See application file for complete search history.

(56) References Cited

U.S. PATENT DOCUMENTS

2018/0345577 A1* 12/2018 Takeyama ............. B29C 64/118
2022/0242072 A1*  8/2022 Nagabandi ............ B29C 64/118
2023/0034915 A1*  2/2023 Ong ...................... B29C 64/135

FOREIGN PATENT DOCUMENTS

CN         105881913        8/2016
CN         211279771        8/2020
(Continued)

OTHER PUBLICATIONS

Liu, CN211279771U, machine translation to ENG, publ Aug. 18, 2020. (Year: 2020).*

(Continued)

*Primary Examiner* — Joseph S Del Sole
*Assistant Examiner* — Lawrence D. Hohenbrink, Jr.
(74) *Attorney, Agent, or Firm* — Amin, Turocy & Watson, LLP

(57) ABSTRACT

In a three dimensional shaping method and a three dimensional shaping apparatus, when a three dimensional object is obtained by laminating a resin material having thermoplasticity, the resin material is melted, and the melted resin material is laminated in a chamber to form resin layers. Next, the pressure in the chamber is adjusted to maintain the temperature of each of the resin layers within a predetermined temperature range in the chamber.

10 Claims, 22 Drawing Sheets

(51) Int. Cl.
  *B33Y 40/00* (2020.01)
  *B29C 64/25* (2017.01)

(56) References Cited

FOREIGN PATENT DOCUMENTS

| | | | |
|---|---|---|---|
| CN | 211279771 U | * | 8/2020 |
| JP | 3995933 | | 1/2003 |
| WO | 00/78519 | | 12/2000 |
| WO | 2017/085961 | | 5/2017 |

OTHER PUBLICATIONS

Japanese Office Action for Japanese Patent Application No. 2020-194970 dated May 31, 2022.

\* cited by examiner

THREE DIMENSIONAL SHAPING METHOD AND THREE DIMENSIONAL SHAPING APPARATUS

CROSS-REFERENCE TO RELATED APPLICATIONS

This application is based upon and claims the benefit of priority from Japanese Patent Application No. 2020-194970 filed on Nov. 25, 2020, the contents of which are incorporated herein by reference.

BACKGROUND OF THE INVENTION

Field of the Invention

The present invention relates to a three dimensional shaping method and a three dimensional shaping apparatus.

Description of the Related Art

In a fused filament fabrication (FFF) 3D printer, a resin material having thermoplasticity is melted and laminated to form a resin layer. Thus, a desired three dimensional object is obtained. In this case, the resin material is a filament or a pellet made of a thermoplastic resin such as acrylonitrile butadiene styrene (ABS). Here, when the next resin layer is laminated on the solidified resin layer, the interlayer strength of the three dimensional object is reduced. In addition, in a case where a melted resin material is extruded from an extruder and laminated, when the surface of resin layer formed by laminating the resin material is rapidly cooled, residual stress is generated in the three dimensional object.

JP 3995933 B2 discloses forming a three dimensional object in a state in which the inside of a chamber is heated in order to reduce residual stress and strain generated in the three dimensional object.

SUMMARY OF THE INVENTION

However, it is difficult to control the temperature of the resin layer, which is a workpiece, to be uniform by simply heating the inside of the chamber. Therefore, with the technique disclosed in JP 3995933 B2, it is difficult to reduce the residual stress generated in the three dimensional object. In addition, it is also difficult to ensure interlayer strength of the three dimensional object.

In view of the above-described problems, it is desired to reduce residual stress generated in a three dimensional object while appropriately controlling the temperature of a resin layer, which is a workpiece. In addition, it is required to ensure interlayer strength of the three dimensional object.

An object of the present invention is to solve the above-described problems.

A first aspect of the present invention is a three dimensional shaping method for obtaining a three dimensional object by laminating a resin material having thermoplasticity, the three dimensional shaping method comprising: a melting step of melting the resin material, a laminating step of laminating the melted resin material in a chamber to form a resin layer, and a pressure adjusting step of adjusting pressure in the chamber to maintain a temperature of the resin layer within a predetermined temperature range in the chamber.

A second aspect of the present invention is a three dimensional shaping apparatus that obtains a three dimensional object by laminating a resin material having thermoplasticity, the three dimensional shaping apparatus comprising: a chamber; a head unit disposed in the chamber and configured to melt the resin material and laminate the melted resin material in the chamber to form a resin layer; and a pressure adjustment unit configured to adjust pressure in the chamber, wherein the pressure adjustment unit adjusts the pressure in the chamber to maintain a temperature of the resin layer within a predetermined temperature range in the chamber.

In the present invention, the natural convection heat transfer coefficient is reduced by adjusting the pressure in the chamber to reduce the pressure in the chamber. This makes it possible to slow down the cooling rate of a resin layer when the resin layer is formed by laminating the melted resin material. As a result, the temperature of each of the resin layers laminated in the chamber can be maintained within a predetermined temperature range. In addition, it is possible to appropriately control the temperature of the resin layer, which is a workpiece. Therefore, residual stress generated in the three dimensional object is reduced. Further, the interlayer strength of the three dimensional object can be ensured.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
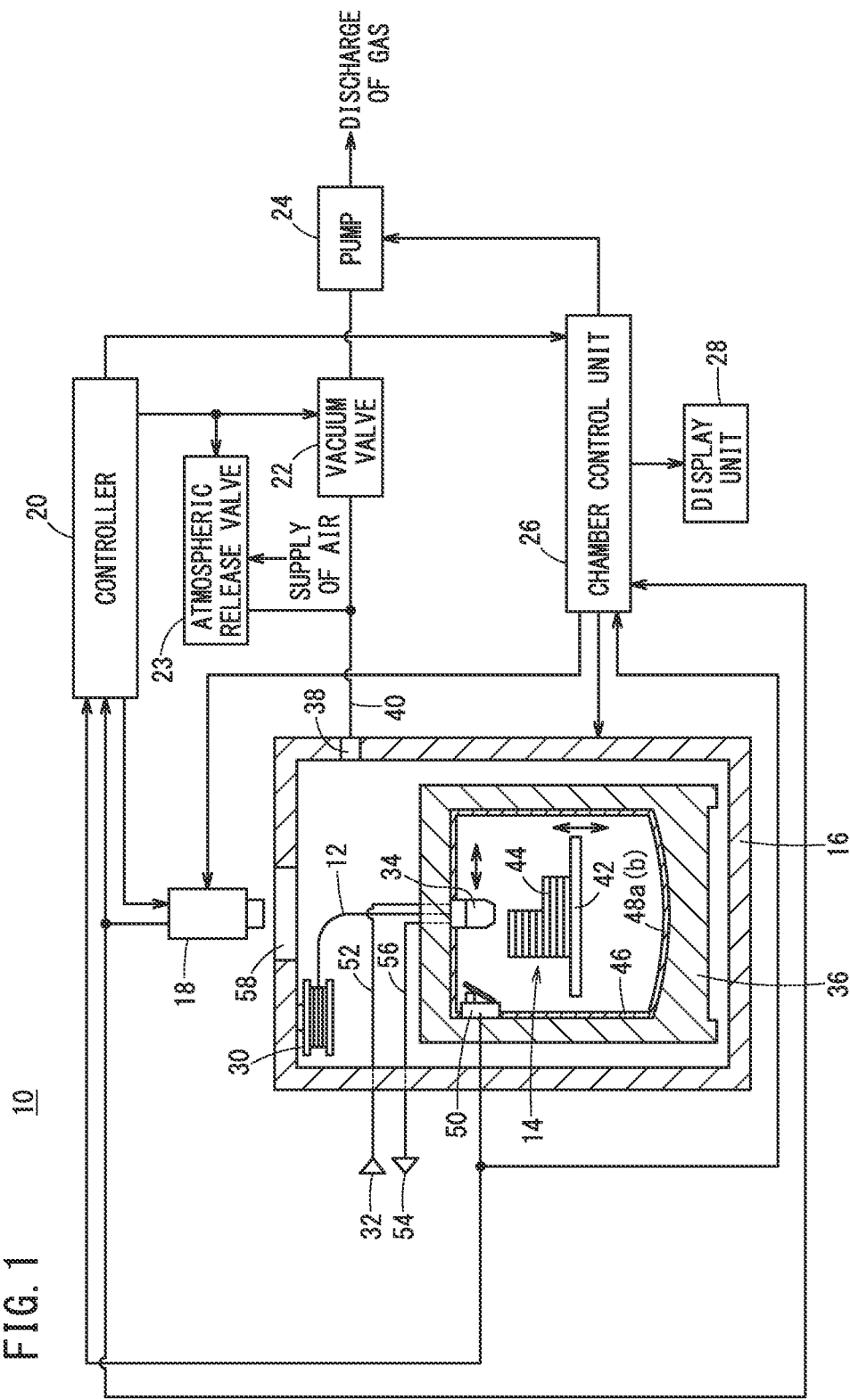
FIG. 1 is a schematic configuration diagram of a three dimensional shaping apparatus according to a present embodiment.
Figure 2:
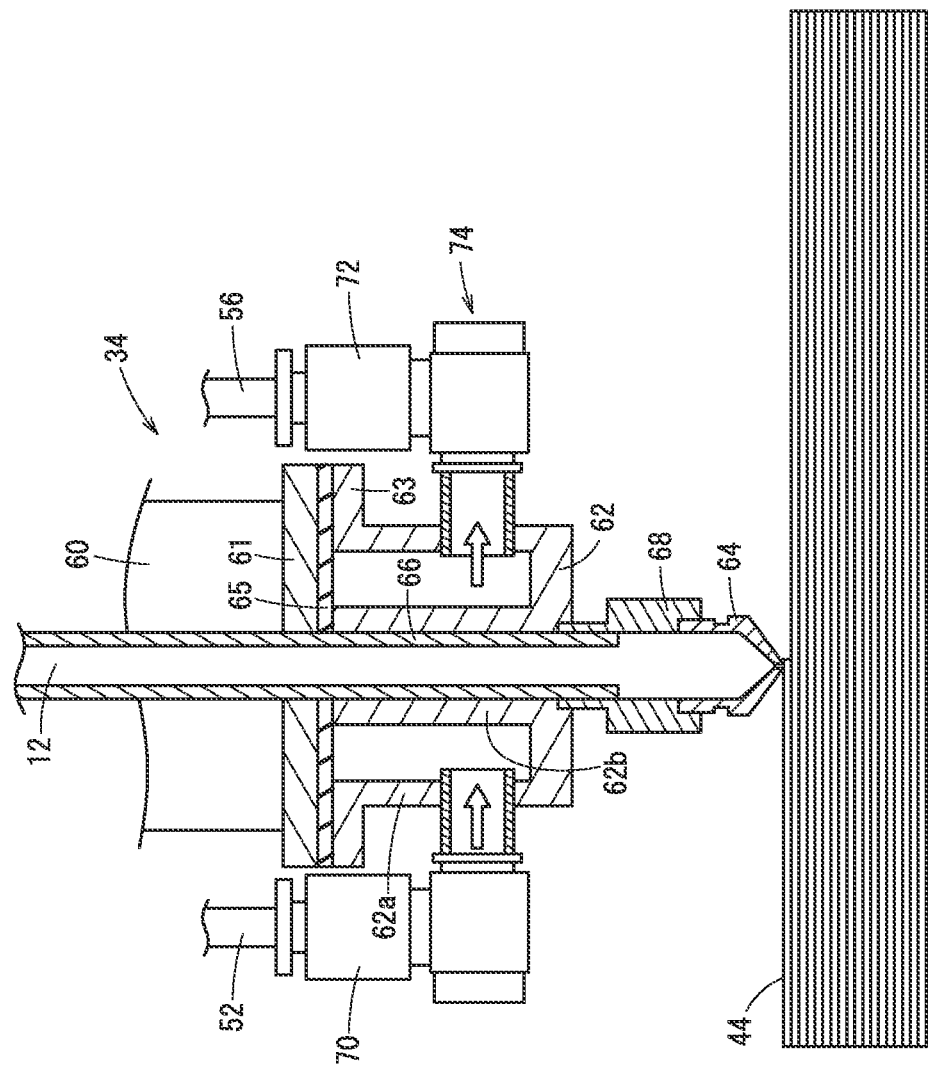
FIG. 2 is a configuration diagram of a head unit of FIG. 1.
Figure 3:
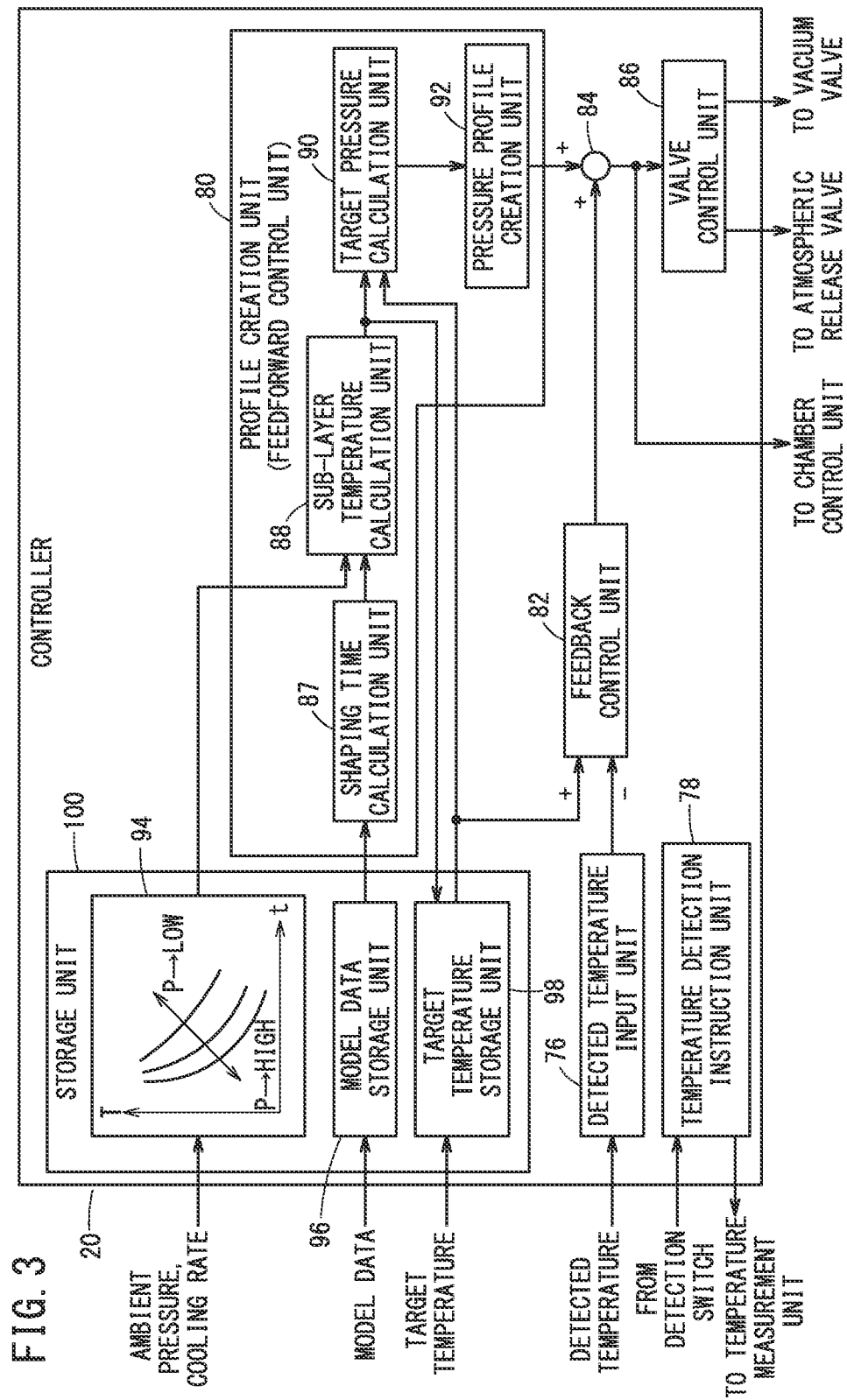
FIG. 3 is a block diagram of a controller of FIG. 1.

As shown in FIGS. 1 to 3, a three dimensional shaping apparatus 10 according to a present embodiment is an apparatus that forms a three dimensional object 14 by laminating a resin material 12 into a desired shape and integrating the resin layers. That is, the three dimensional shaping apparatus 10 is a so-called 3D printer. The three dimensional object 14 can be formed into various shapes depending on its use or the like.

The resin material 12 is a filament or a pellet made of thermoplastic resin such as ABS. In the following description, the resin material 12 is a filament made of ABS. The shape (for example, the diameter of the filament or pellet) and the ingredient of the resin material 12 may be appropriately set according to the use or the like of the three dimensional object 14.

As shown in FIG. 1, the three dimensional shaping apparatus 10 includes a chamber 16, a temperature measurement unit 18, a controller 20, a vacuum valve 22, an atmospheric release valve 23, a pump 24, a chamber control unit 26, a display unit 28, a resin material supply source 30, a coolant supply source 32, a head unit 34, and a housing 36.

The chamber 16 is a vacuum container. A discharge port 38 of the chamber 16 is connected to the pump 24 via a discharge flow path 40. The vacuum valve 22 is provided in the middle of the discharge flow path 40. The atmospheric release valve 23 is connected between the discharge port 38 and the vacuum valve 22 in the discharge flow path 40. When the pump 24 is driven in a state in which the vacuum valve 22 is open, gas such as air in the chamber 16 is discharged to the outside via the discharge flow path 40 and the pump 24. As a result, the pressure in the chamber 16 decreases. Further, when the atmospheric release valve 23 is opened, outside air can be supplied into the chamber 16 through the atmospheric release valve 23, the discharge flow path 40, and the discharge port 38.

The housing 36 serving as a body portion of the 3D printer is accommodated in the chamber 16. A stage 42 is disposed substantially horizontally in the housing 36. Further, in the housing 36, the head unit 34 is disposed above the stage 42 so as to face the upper surface of the stage 42.

The resin material supply source 30 provided inside the chamber 16 supplies the resin material 12 to the head unit 34. The head unit 34 melts the resin material 12 and extrudes the melted resin material 12 toward the upper surface of the stage 42. The head unit 34 is moved in the horizontal direction (X-Y direction) by driving of a head unit moving mechanism (not shown). When the resin material 12 is extruded from the head unit 34, the extruded resin material 12 is laminated on the upper surface of the stage 42. As a result, one resin layer 44 (the first resin layer 44) is formed. FIG. 1 illustrates a case where the resin material supply source 30 is a reel. The resin material supply source 30 may be other than a reel.

After the first resin layer 44 is formed, the stage 42 is lowered by the height of one resin layer 44 by driving of a stage moving mechanism (not shown). Next, the head unit 34 extrudes the resin material 12 while being moved in the horizontal direction by driving of the head unit moving mechanism. The extruded resin material 12 is laminated on the first resin layer 44. As a result, the second resin layer 44 is formed.

In this manner, lowering of the stage 42, movement of the head unit 34 in the horizontal direction, and extrusion of the resin material 12 from the head unit 34 are repeatedly performed. Thus, a plurality of resin layers 44 are sequentially laminated on the upper surface of the stage 42 in the upward direction. As a result, the three dimensional object 14 having a desired shape is formed on the upper surface of the stage 42.

A reflective paint 48a is applied to an inner wall surface 46 of the housing 36. Alternatively, metallic foil 48b is attached to the inner wall surface 46. A detection switch 50 is provided on an upper portion of the inner wall surface 46 of the housing 36 on the left side. When the head unit 34 moves to the inner wall surface 46 of the housing 36 on the left side, the head unit 34 comes into contact with the detection switch 50. At this time, the detection switch 50 outputs a detection signal indicating that the head unit 34 has been retracted to the inner wall surface 46.

The coolant supply source 32 is provided outside the chamber 16. The coolant supply source 32 and the head unit 34 are connected via a coolant supply path 52. The head unit 34 is connected to a discharge port 54 outside the chamber 16 via a coolant discharge path 56.

A window 58 is provided in the upper portion of the chamber 16. The window 58 is used to visually recognize the inside of the chamber 16 from the outside. The temperature measurement unit 18 is provided above the window 58. The temperature measurement unit 18 measures the surface temperature of the resin layer 44, which is a workpiece, in a non-contact manner through the window 58. The surface temperature of the resin layer 44 is, for example, the surface temperature of the upper surface of the resin layer 44 that is being shaped (formed). The temperature measurement unit 18 is preferably an infrared thermal camera or a radiation thermometer. The temperature measurement unit 18 outputs a detection result of the measured surface temperature (detected temperature) of the resin layer 44 to the chamber control unit 26 and the controller 20.

The chamber control unit 26 is a controller such as a control board provided outside the chamber 16. The chamber control unit 26 controls the entire chamber 16. That is, the chamber control unit 26 moves the head unit 34 in the horizontal direction by controlling the head unit moving mechanism. Further, the chamber control unit 26 move the stage 42 in the vertical direction (Z direction) by controlling the stage moving mechanism. Furthermore, the chamber control unit 26 reduces the pressure in the chamber 16 by driving the pump 24.

In addition, the chamber control unit 26 acquires the surface temperature of the resin layer 44 from the temperature measurement unit 18 by controlling the temperature measurement unit 18. Specifically, the chamber control unit 26 instructs the temperature measurement unit 18 to measure the surface temperature of the resin layer 44 formed by laminating the resin material 12 extruded from the head unit 34.

Specifically, when the temperature measurement unit 18 is an infrared thermal camera, the chamber control unit 26 instructs the temperature measurement unit 18 to measure and output the surface temperature of the resin layer 44 at the time when the resin layer 44 is formed. The surface temperature of the resin layer 44 is a sub-layer temperature Ts described later.

In the case of an infrared thermal camera, there is a possibility that the resin layer 44 cannot be imaged depending on the mounting position of the infrared thermal camera and the position of the head unit 34. In this case, the chamber control unit 26 instructs the temperature measurement unit 18 to measure the surface temperature of the resin layer 44 as described below. That is, when the detection switch 50 detects that the head unit 34 is retracted to the inner wall surface 46 of the housing 36, a detection signal is output from the detection switch 50 to the chamber control unit 26. Then, when the detection signal is input to the chamber control unit 26, the chamber control unit 26 instructs the temperature measurement unit 18 to measure the surface temperature of the resin layer 44.

In the following description, a case where the temperature measurement unit 18 is an infrared thermal camera will be mainly described. When the temperature measurement unit 18 is a radiation thermometer, the chamber control unit 26 instructs the temperature measurement unit 18 to sequentially measure and output the surface temperature of the resin layer 44.

The display unit 28 is a display device such as a liquid crystal display that displays various types of information based on control from the chamber control unit 26.

The controller 20 is a microcomputer or the like. The controller 20 includes a computation unit and a storage unit 100 (see FIG. 3). The computation unit can be configured by, for example, a processor such as a central processing unit (CPU), but is not limited thereto. The controller 20 controls opening and closing of the vacuum valve 22 and the atmospheric release valve 23 based on the surface temperature of the resin layer 44 measured by the temperature measurement unit 18. The pressure in the chamber 16 is adjusted by controlling opening and closing of the vacuum valve 22 and the atmospheric release valve 23. Further, the controller 20 controls the temperature measurement unit 18 as necessary. Furthermore, the controller 20 supplies predetermined information to the chamber control unit 26. The controller 20 may be configured separately from the chamber control unit 26. Alternatively, the controller 20 may be integrated with the chamber control unit 26.

FIG. 2 shows a detailed configuration of the head unit 34. The head unit 34 includes a support portion 60, a cooling portion 62, a heater 68, a nozzle 64, and a guide tube portion 66. The support portion 60 is a base end portion of the head unit 34. The support portion 60 is supported by the head unit moving mechanism. The cooling portion 62 is a hollow housing portion attached to a flange 61 on the lower side (distal end) of the support portion 60. The heater 68 is attached to a lower end portion of the cooling portion 62. The heater 68 has a tubular shape. The nozzle 64 is attached to a lower end portion of the heater 68. The guide tube portion 66 passes through the cooling portion 62 and is connected to the heater 68. The guide tube portion 66 guides the resin material 12 to the nozzle 64 via the heater 68.

The cooling portion 62 includes an outer tube portion 62a and an inner tube portion 62b. A flange 63 is formed at an upper end portion of the outer tube portion 62a. A lower portion of the outer tube portion 62a and a lower portion of the inner tube portion 62b are connected to each other. The lower portion of the outer tube portion 62a and the lower portion of the inner tube portion 62b constitute the lower end portion of the cooling portion 62. Therefore, the cooling portion 62 is a bottomed double-cylindrical tubular member. The guide tube portion 66 is inserted through the inner side of the inner tube portion 62b. A distal end portion (lower end portion) of the guide tube portion 66 protrudes downward from the lower end portion of the cooling portion 62. The heater 68 is attached to the lower end portion of the cooling portion 62 so as to surround the distal end portion of the guide tube portion 66. A seal portion 65 is interposed between the flange 61 of the support portion 60, and the flange 63 and the inner tube portion 62b of the cooling portion 62.

A supply joint 70 is provided on the left side of the cooling portion 62. The supply joint 70 is connected to the coolant supply path 52. A discharge joint 72 is provided on the right side of the cooling portion 62. The discharge joint 72 is connected to the coolant discharge path 56. The coolant supply path 52, the supply joint 70, the cooling portion 62, the discharge joint 72, and the coolant discharge path 56 constitute a cooling flow path 74.

The resin material 12 is supplied from the resin material supply source 30 (see FIG. 1) to the heater 68 via the guide tube portion 66. The heater 68 heats and melts the resin material 12 supplied from the guide tube portion 66, based on the control of the chamber control unit 26. The melted resin material 12 is supplied to the nozzle 64. Therefore, the nozzle 64 can eject the resin material 12 in a melted state toward the upper surface of the stage 42.

In the cooling flow path 74, a coolant such as air is supplied from the coolant supply source 32 to the cooling portion 62 via the coolant supply path 52 and the supply joint 70. The cooling portion 62 cools the resin material 12 in the guide tube portion 66 by the supplied coolant. Accordingly, it is possible to prevent heat from the heater 68 from being transferred to the resin material 12 in the guide tube portion 66. The coolant after cooling is discharged from the discharge port 54 outside the chamber 16 via the discharge joint 72 and the coolant discharge path 56. The seal portion 65 is provided above the nozzle 64 and the heater 68. The seal portion 65 is separated from the nozzle 64 and the heater 68. This makes it possible to ensure the sealing performance of the cooling portion 62 while avoiding the influence of heat from the heater 68. As a result, a seal member having low heat resistance can be used as the seal portion 65.

Note that, in order to adjust the flow rate of the coolant, a flow rate adjusting valve such as a speed controller may be provided in the cooling flow path 74. In the cooling flow path 74, a check valve (non-return valve) may be provided in the coolant supply path 52 or the coolant discharge path 56. With this configuration, when the coolant supply path 52 or the coolant discharge path 56 comes off in the chamber 16, the coolant is quickly discharged to the outside via the check valve. As a result, an increase in pressure in the chamber 16 can be avoided.

FIG. 3 is a detailed block diagram of the controller 20. The controller 20 reads and executes a program stored in a non-transitory storage medium (not shown). The controller 20 realizes functions of a detected temperature input unit 76, a temperature detection instruction unit 78, a profile creation unit 80, a feedback control unit 82, an addition unit 84, and a valve control unit 86 (pressure adjustment unit) by executing the program. The profile creation unit 80 functions as a feedforward control unit. The profile creation unit 80 is constituted by a shaping time calculation unit 87, a sub-layer temperature calculation unit 88, a target pressure calculation unit 90, and a pressure profile creation unit 92. Further, the controller 20 includes the storage unit 100. The storage unit 100 includes a data storage unit 94, a model data storage unit 96, and a target temperature storage unit 98.

The data storage unit 94 stores data indicating a relationship between a sub-layer temperature Ts and a shaping time tm, as a table or a map. When the resin layer 44 is formed by laminating the melted resin material 12, the surface temperature of this resin layer 44 is the sub-layer temperature Ts. The shaping time tm is a time required for forming one resin layer 44 using the head unit 34 (see FIGS. 1 and 2). This data is stored in the data storage unit 94 as a table for each ambient pressure around the resin layer 44 formed by laminating the melted resin material 12. The shaping time tm is a parameter related to shaping of each resin layer 44 of the three dimensional object 14. The shaping time tm changes depending on the shape or the like of the three dimensional object 14.

As described above, in the three dimensional shaping apparatus 10, only the heater 68 heats the resin material 12. Therefore, as will be described later, the surface temperature of the resin layer 44 formed by laminating the resin material 12 ejected from the nozzle 64 decreases with time. That is, as the shaping time tm increases, the surface temperature of the resin layer 44 decreases. Moreover, the cooling rate of the resin layer 44 changes depending on the ambient pressure around the resin layer 44. Therefore, the data storage unit 94 stores data indicating a relationship between the ambient pressure around the resin layer 44 and the cooling rate of the resin layer 44.

The model data storage unit 96 stores model data (model data 102 to be described later) of the three dimensional object 14 formed by the three dimensional shaping apparatus 10.

The target temperature storage unit 98 stores a target value (target temperature) of the surface temperature of the resin layer 44. The target temperature is a temperature at which residual stress generated in the three dimensional object 14 when the three dimensional object 14 is shaped can be reduced. Further, the target temperature is a temperature at which the interlayer strength of the resin layers 44 of the three dimensional object 14 can be ensured. The target temperature includes a predetermined temperature range having an upper limit and a lower limit. Therefore, the target temperature may be a specific temperature target value. Alternatively, the target temperature may be a specific temperature range.

The data indicating the relationship between the sub-layer temperature Ts and the shaping time tm is stored in advance in the data storage unit 94 prior to shaping of the three dimensional object 14. The model data 102 is stored in advance in the model data storage unit 96 prior to shaping of the three dimensional object 14. The target temperature is stored in advance in the target temperature storage unit 98 prior to shaping of the three dimensional object 14.

Similarly to the chamber control unit 26, the temperature detection instruction unit 78 instructs the temperature measurement unit 18 to measure the surface temperature of the resin layer 44. The surface temperature of the resin layer 44 is the surface temperature of the resin layer 44 formed by laminating the melted resin material 12. The detected temperature input unit 76 acquires the surface temperature of the resin layer 44 measured by the temperature measurement unit 18.

The shaping time calculation unit 87 calculates the shaping time tm of each resin layer 44 of the three dimensional object 14 using the model data 102 stored in the model data storage unit 96.

The sub-layer temperature calculation unit 88 calculates (predicts) the sub-layer temperature Ts with reference to the data storage unit 94. As described above, the sub-layer temperature Ts is the surface temperature of the resin layer 44 corresponding to the shaping time tm calculated by the shaping time calculation unit 87. More specifically, when one resin layer 44 is formed and the next resin layer 44 is formed on the upper surface of the resin layer 44 (previous resin layer 44) thus formed, the surface temperature of the previous resin layer 44 (already formed resin layer 44) is the sub-layer temperature Ts. Each of the resin layers 44 is formed by laminating the melted resin material 12. Further, the next resin layer 44 is a new resin layer 44 laminated on the upper surface of the previous resin layer 44. Therefore, the sub-layer temperature Ts is the surface temperature of the previous resin layer 44 immediately before the new resin layer 44 is formed.

In this manner, the sub-layer temperature calculation unit 88 predicts the sub-layer temperature Ts. The sub-layer temperature calculation unit 88 may store the predicted sub-layer temperature Ts as the target temperature in the target temperature storage unit 98. In this case, the target temperature is a target value of the sub-layer temperature Ts based on data indicating the relationship between the ambient pressure around the resin layer 44 and the cooling rate of the resin layer 44.

The target pressure calculation unit 90 calculates a target pressure Pt by using the sub-layer temperature Ts calculated by the sub-layer temperature calculation unit 88 and the target temperature stored in the target temperature storage unit 98. The target pressure Pt is a target value of the pressure in the chamber 16 that reduces the residual stress generated in the three dimensional object 14 and ensures the interlayer strength of the three dimensional object 14.

The pressure profile creation unit 92 uses the target pressure Pt calculated by the target pressure calculation unit 90 to create a pressure profile indicating a temporal change of the pressure in the chamber 16. The pressure profile is a profile indicating a temporal change of the pressure in the chamber 16 such that the sub-layer temperature Ts is maintained at the target temperature (in the predetermined temperature range).

The feedback control unit 82 calculates a deviation between the target temperature stored in the target temperature storage unit 98 and the surface temperature (detected temperature Td) of the resin layer 44 input to the detected temperature input unit 76. Specifically, when one resin layer 44 is formed and then the next resin layer 44 is formed, the surface temperature of the one layer 44 that has been previously formed is the detected temperature Td. That is, the detected temperature Td is a measured value of the sub-layer temperature Ts. Based on the calculated deviation, the feedback control unit 82 outputs a target pressure value in the chamber 16 at which the sub-layer temperature Ts is maintained at the target temperature (in predetermined temperature range).

The addition unit 84 regards the pressure profile created by the pressure profile creation unit 92 as a feedforward amount. Further, the addition unit 84 regards the target pressure value in the chamber 16 output by the feedback control unit 82 as a feedback amount. Furthermore, the addition unit 84 adds the pressure profile and the target pressure value. The addition unit 84 outputs this addition result to the valve control unit 86 and the chamber control unit 26 as a control amount for controlling the pressure in the chamber 16. When only one of the pressure profile creation unit 92 or the feedback control unit 82 operates, the addition unit 84 outputs the output result from the operating one of the pressure profile creation unit 92 or the feedback control unit 82, to the valve control unit 86 and the chamber control unit 26 as the control amount.

The valve control unit 86 controls opening and closing of the vacuum valve 22 and the atmospheric release valve 23 based on the control amount input from the addition unit 84. Further, the chamber control unit 26 controls driving of the pump 24 based on the control amount input from the addition unit 84.

Next, an operation (three dimensional shaping method) of the three dimensional shaping apparatus 10 according to the present embodiment will be described with reference to FIGS. 4 to 21. Here, description will be made with reference also to FIGS. 1 to 3 as necessary.

Prior to the description of the operation of the present embodiment, the technical content on which the operation is based will be described with reference to FIGS. 4 to 9.

In general, when there is an object having a relatively high temperature in the air, if the air comes into contact with the object, the air in the vicinity of the object is heated. The heated air expands, becomes lighter, and rises due to buoyancy. This results in a flow called natural convection. As a result, heat is easily transferred.

Here, the amount of heat transfer by natural convection is represented by $Q\text{conv}$, the natural convection heat transfer coefficient is represented by $h\text{conv}$, the heat transfer area is represented by $A$, the temperature of an object is represented by $Tw$, and the temperature of air is represented by $Ta$. In this case, the heat transfer amount $Q\text{conv}$ is expressed by the following expression (1).

$$Q\text{conv} = h\text{conv} \times A \times (Tw - Ta) \quad (1)$$

Figure 4:
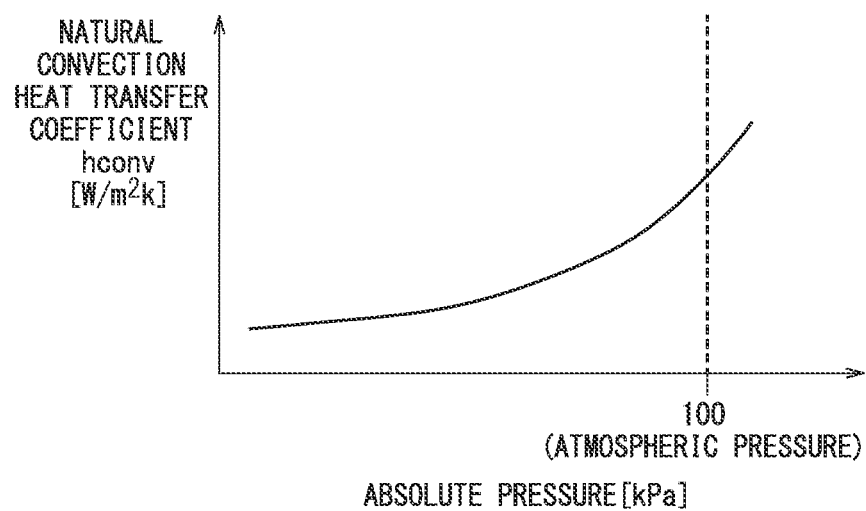
FIG. 4 is a diagram showing a relationship between a natural convection heat transfer coefficient and pressure (absolute pressure)

Incidentally, if the gas is decompressed, the gas density decreases. As a result, buoyancy is reduced and heat transfer due to natural convection is suppressed. That is, as shown in FIG. 4, when the air pressure decreases, the natural convection heat transfer coefficient $h\text{conv}$ decreases. Therefore, in a reduced-pressure environment, the natural convection heat transfer coefficient $h\text{conv}$ decreases, and the heat retaining effect increases.

Thus, the three dimensional shaping apparatus 10 shown in FIG. 1 was used to examine whether the sub-layer temperature $Ts$ was maintained for a certain period of time by reducing the pressure in the chamber 16.

Figure 5:
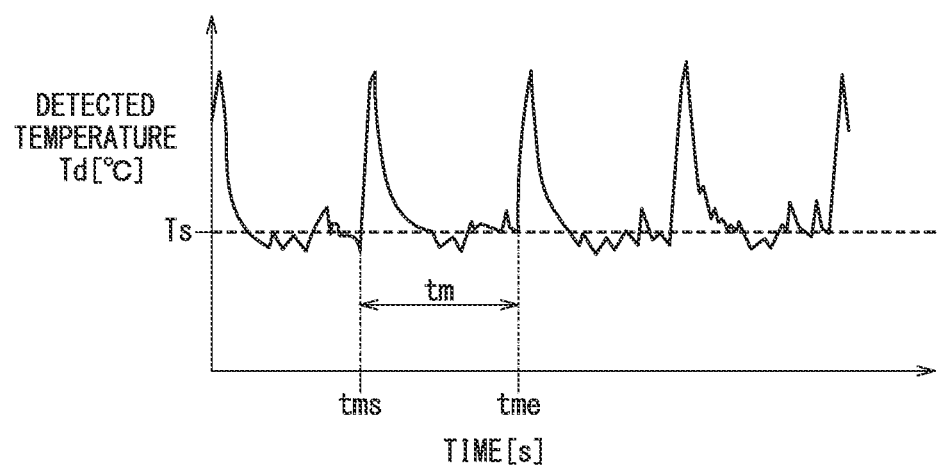
FIG. 5 is a timing chart showing the surface temperature of a workpiece (detected temperature of the surface of a resin layer) over time.

FIG. 5 shows a temporal change of the detection result of the surface temperature (detected temperature $Td$) of each of the resin layers 44 when the resin layers 44 are sequentially laminated to form the three dimensional object 14. Here, a temporal change of the surface temperature (detected temperature $Td$) of one resin layer 44 at a starting point of forming the one resin layer 44 is shown.

When one resin layer 44 is formed, the head unit 34 is moved above the starting point. Next, ejection of the melted resin material 12 from above the starting point toward the upper surface of the stage 42 is started. In this case, the time point at which the ejection of the resin material 12 is started is a start time point $tms$ of the shaping time $tm$. Next, the head unit 34 ejects the melted resin material 12 while being moved in the horizontal direction by the head unit moving mechanism. Thereafter, the head unit 34 stops ejecting the resin material 12 at an end point. Finally, the head unit 34 is moved to above the starting point of the next resin layer 44 by the head unit moving mechanism. The time point at which the head unit 34 is moved to above the starting point is an end time point $tme$ of the shaping time $tm$.

As shown in FIG. 5, the surface temperature at the starting point of one resin layer 44 is the highest immediately after the start time point $tms$ within the shaping time $tm$. Within the shaping time $tm$, the surface temperature at the starting point decreases with time. Here, the detected temperature $Td$ (surface temperature) at the end time point $tme$ of the shaping time $tm$ is the sub-layer temperature $Ts$. Note that the detected temperature $Td$ temporarily increases immediately before the end time point $tme$ of the shaping time $tm$. This is because the head unit 34 is moved to above the starting point of the next resin layer 44 after the ejection of the resin material 12 is stopped. By moving the head unit 34 to above the starting point of the next resin layer 44, the head unit 34 is positioned in the vicinity of the starting point of the one resin layer 44. As a result, the detected temperature $Td$ temporarily increases.

As described above, when the next resin layer 44 is laminated on the solidified resin layer 44, the interlayer strength of the three dimensional object 14 is reduced. Further, when the resin layer 44 is rapidly cooled, residual stress is generated in the three dimensional object 14. As shown in FIG. 5, when one resin layer 44 is formed, the detected temperature $Td$ (sub-layer temperature $Ts$) is the lowest at the end time point $tme$ of the shaping time $tm$. Therefore, it is considered that the residual stress can be reduced and the interlayer strength can be ensured by increasing the effect of retaining the temperature in the chamber 16 to suppress the decrease in the sub-layer temperature $Ts$.

Figure 6:
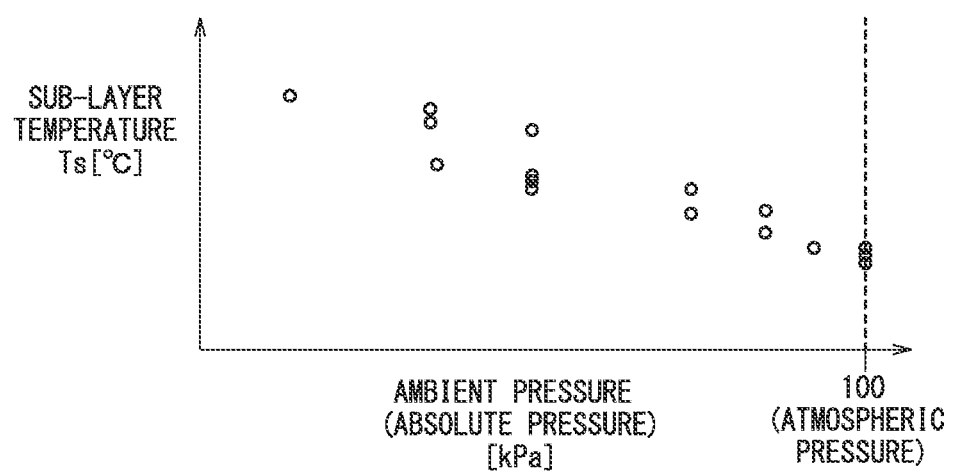
FIG. 6 is a diagram showing a relationship between a sub-layer temperature and ambient pressure.

FIG. 6 shows the relationship between the ambient pressure around the resin layer 44 (pressure inside the chamber 16) and the sub-layer temperature $Ts$. As shown in FIG. 6, when the pressure in the chamber 16 is reduced, the sub-layer temperature $Ts$ increases. That is, by reducing the pressure in the chamber 16, the natural convection heat transfer coefficient $h\text{conv}$ (see FIG. 4) decreases, and the effect of retaining the temperature in the chamber 16 increases.

Figure 7:
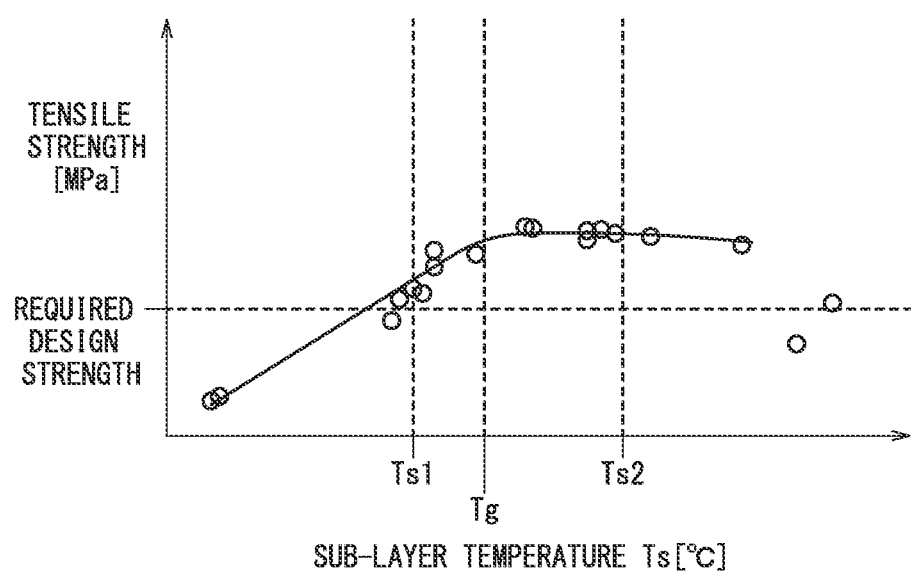
FIG. 7 is a diagram showing a relationship between the tensile strength of a three dimensional object and the sub-layer temperature.

FIG. 7 shows the relationship between the sub-layer temperature $Ts$ and the tensile strength between the resin layers 44 of the three dimensional object 14. As shown in FIG. 7, when the sub-layer temperature $Ts$ is in the temperature range of $Ts1$ to $Ts2$, it is possible to ensure a tensile strength equal to or higher than a required design strength. The required design strength is the minimum value of the interlayer strength required according to the specification of the three dimensional object 14. In this case, the above-described temperature range includes a temperature region lower than a glass transition temperature $Tg$. This temperature region also includes $Ts1$. Therefore, in the present embodiment, even when the sub-layer temperature $Ts$ is lower than the glass transition temperature $Tg$, a tensile strength equal to or higher than the required design strength can be ensured. Therefore, if the sub-layer temperature $Ts$ is appropriately controlled, the strength quality of the three dimensional object 14 can be ensured. When the resin material 12 is ABS resin, it is preferable that $Ts1$ is in the range of 120° C. to 125° C., and $Ts2$ is in the range of 140° C. to 145° C.

Figure 8:
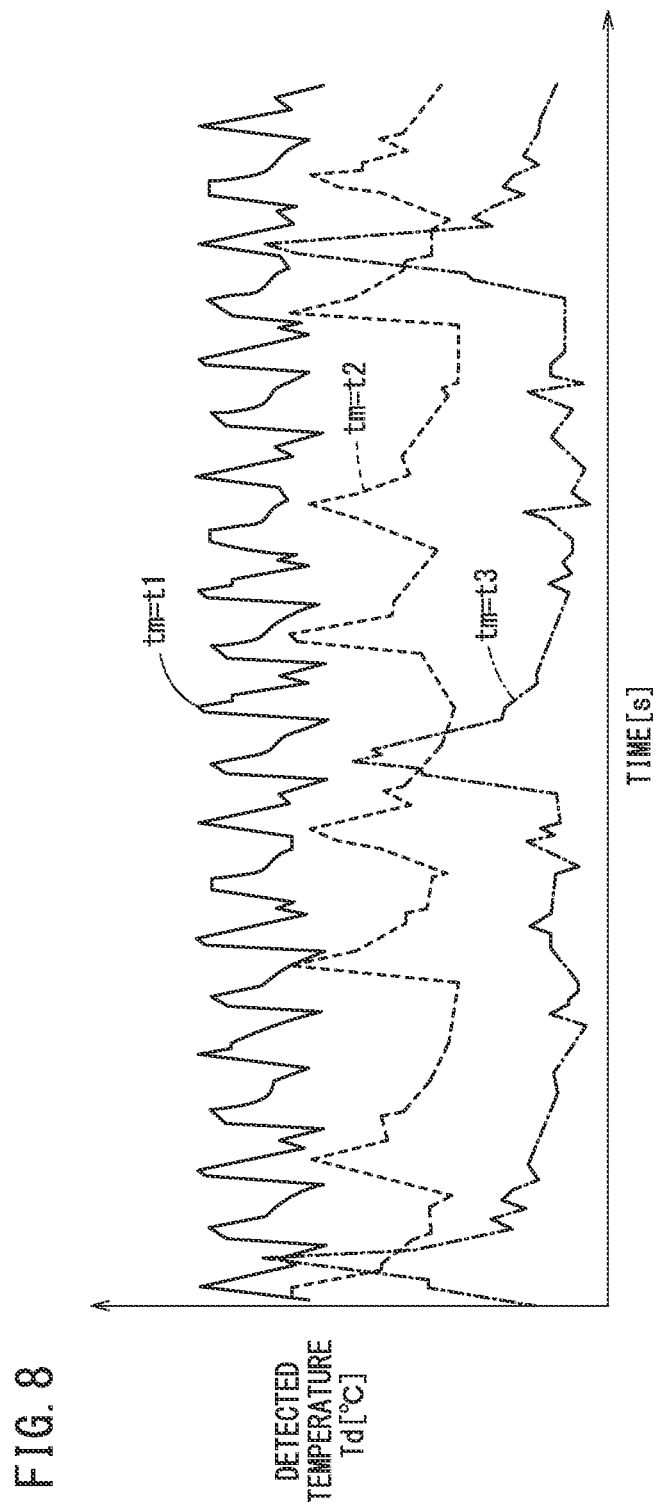
FIG. 8 is a timing chart showing the change of the detected temperature according to the shaping time.
Figure 9:
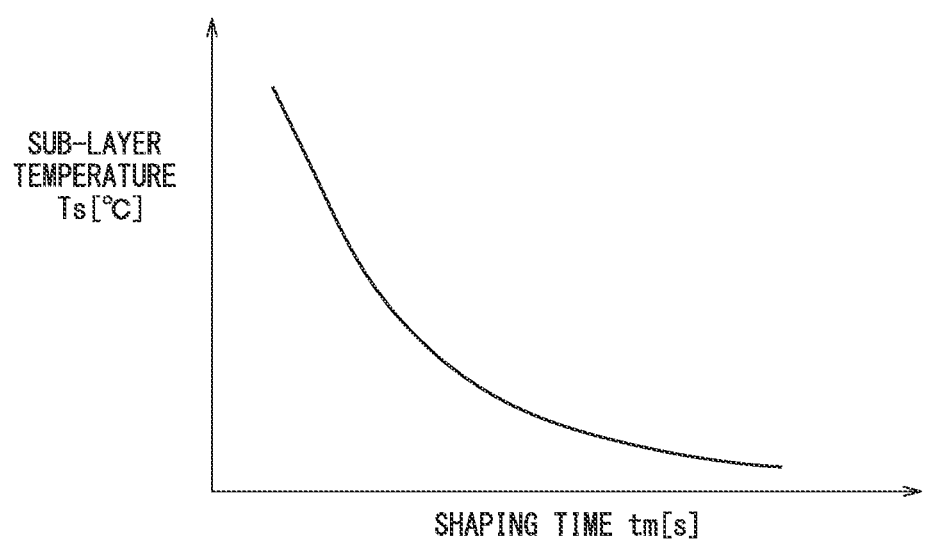
FIG. 9 is a diagram showing a relationship between the sub-layer temperature and a shaping time.

FIGS. 8 and 9 show the relationship between the shaping time $tm$ ($tm = t1 < t2 < t3$) and the detected temperature $Td$, and the shaping time tm and the sub-layer temperature Ts, respectively. FIG. 8 illustrates a temporal change of the detected temperature Td for each shaping time tm. FIG. 9 shows the relationship between the sub-layer temperature Ts and the shaping time tm. As shown in FIGS. 8 and 9, the detected temperature Td and the sub-layer temperature Ts change according to the shaping time tm. That is, as the shaping time tm increases, the detected temperature Td and the sub-layer temperature Ts decrease. This is because, as the shaping time tm increases, the time taken to form one resin layer 44 increases and the heat dissipation energy from the resin layer 44 increases. As the heat dissipation energy increases, the detected temperature Td at the starting point decreases.

As described above, it is clear that, when the three dimensional object 14 is shaped, the pressure in the chamber 16, the sub-layer temperature Ts, and the shaping time tm influence the quality (residual stress and interlayer strength) of the three dimensional object 14. Note that the pressure in the chamber 16 is ambient pressure around the resin layer 44 formed by lamination of the melted resin material 12. Therefore, in the present embodiment, as described below, three factors, namely, the sub-layer temperature Ts, the shaping time tm, and the quality of the three dimensional object 14 are taken into consideration to obtain the three dimensional object 14 with high quality.

Next, operations (first to third examples) of the three dimensional shaping apparatus 10 according to the present embodiment will be described with reference to FIGS. 10 to 21.

First, a first example will be described with reference to FIGS. 10 to 14. In the first example, the shaping time tm of each resin layer 44 is calculated from the model data 102. Next, a pressure profile corresponding to each calculated shaping time tm is created. Then, based on the created pressure profile, the pressure in the chamber 16 is adjusted by feedforward control. Therefore, in the first example, the feedback control unit 82 (see FIG. 3) stops operating.

Figure 10:
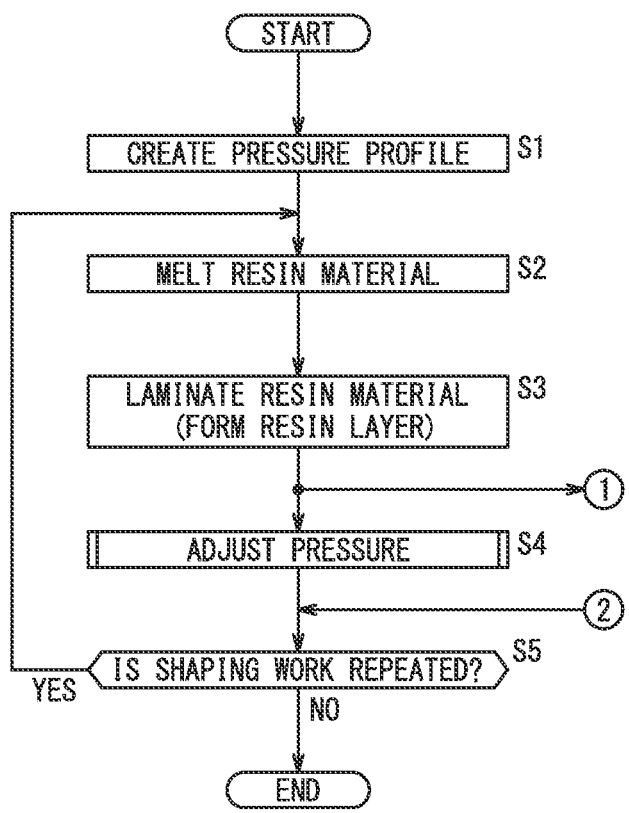
FIG. 10 is a flowchart showing the operation in a first example of the present embodiment.

In step S1 of FIG. 10, the pressure profile is created. FIGS. 12A to 14 each illustrate a method for creating the pressure profile.

Figure 12A:
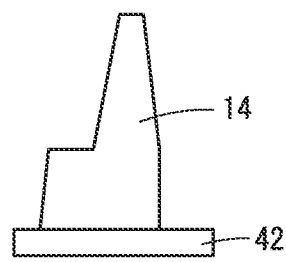
FIGS. 12A and 12B are diagrams each showing model data of the three dimensional object.
Figure 12B:
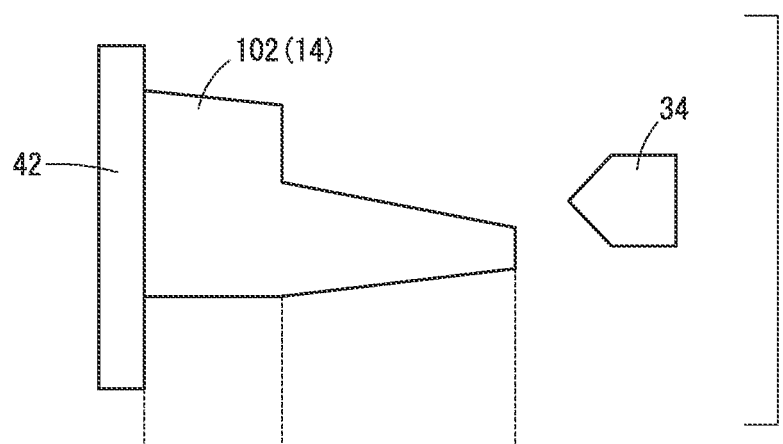
Figure 13:
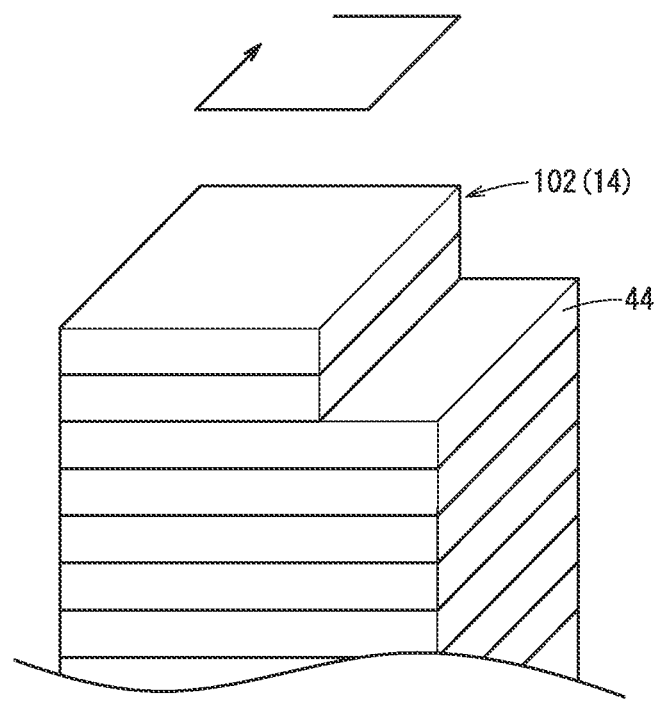
FIG. 13 is a schematic diagram showing a shaping direction of each resin layer.

FIG. 12A illustrates the three dimensional object 14 to be shaped on the stage 42. FIG. 12B shows the model data 102 of the three dimensional object 14 in FIG. 12A. The model data 102 is stored in the model data storage unit 96 (see FIG. 3). Further, FIG. 13 schematically illustrates a horizontal movement path (indicated by an arrow) of the head unit 34 (see FIGS. 1 and 2) when the resin layers 44 are formed using the model data 102 in FIG. 12B.

In step S1, the shaping time calculation unit 87 calculates the shaping time tm of each of the resin layers 44 of the three dimensional object 14 using the model data 102. In addition, the sub-layer temperature calculation unit 88 predicts the sub-layer temperature Ts corresponding to the shaping time tm of each of the resin layers 44 with reference to the data storage unit 94. Further, the target pressure calculation unit 90 calculates a target pressure Pt of each of the resin layers 44 using the sub-layer temperature Ts and the target temperature.

Figure 12C:
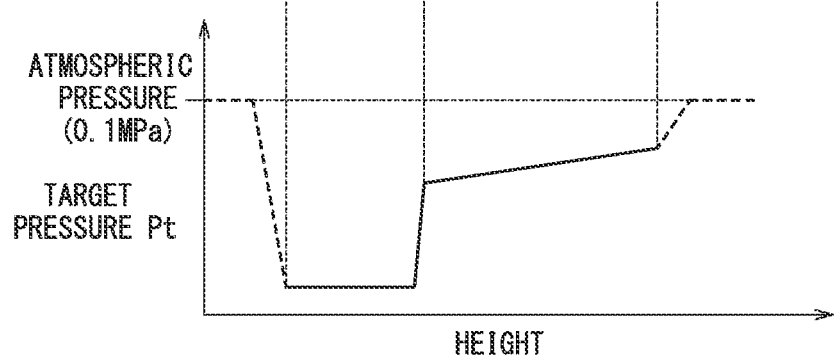
FIG. 12C is a diagram showing a relationship between target pressure and the height of the model data.

FIG. 12C illustrates the relationship between the target pressure Pt and the height of the three dimensional object 14 (the model data 102). As described above, the sub-layer temperature Ts decreases as the shaping time tm increases. Therefore, the target pressure Pt is set to be relatively low for the resin layer 44 for which the shaping time tm is relatively long. As a result, the effect of retaining the temperature in the chamber 16 increases. Further, the target pressure Pt is set to be relatively high for the resin layer 44 for which the shaping time tm is relatively short. As a result, the effect of retaining the temperature in the chamber 16 is reduced.

Figure 14:
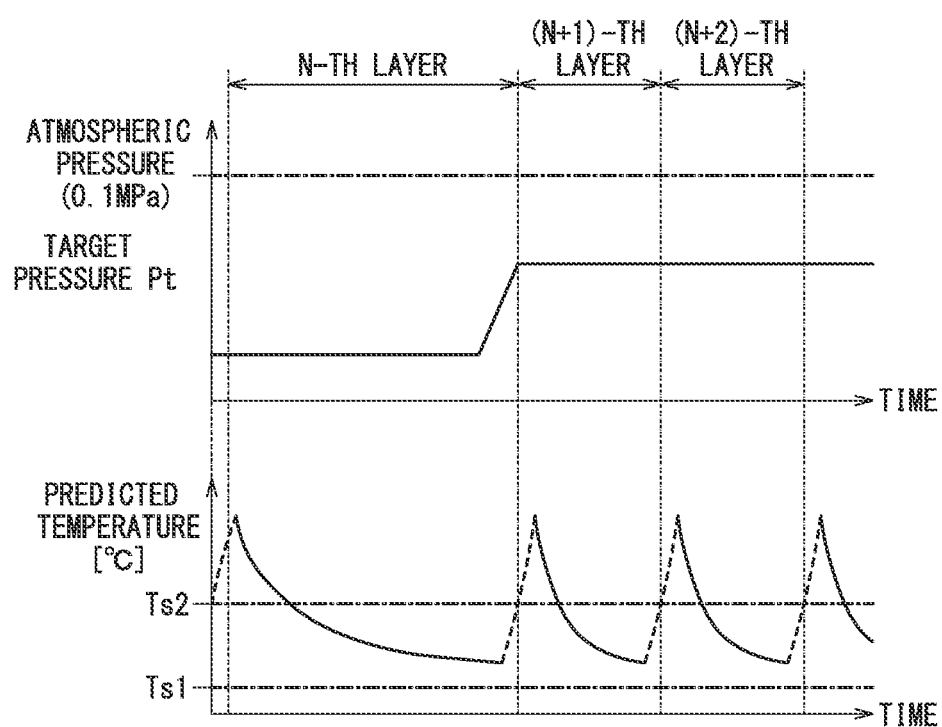
FIG. 14 is a timing chart showing a pressure profile and the surface temperature (predicted temperature) of the workpiece over time.

The pressure profile creation unit 92 creates a pressure profile using the target pressure Pt. FIG. 14 illustrates the pressure profile created using the results of the target pressure Pt in FIG. 12C.

The addition unit 84 outputs the pressure profile as a feedforward amount (control amount), to the valve control unit 86 and the chamber control unit 26.

In next step S2, the heater 68 (see FIG. 2) of the head unit 34 heats and melts the resin material 12. Accordingly, in next step S3, the resin material 12 is melted, and the melted resin material 12 is ejected from the nozzle 64 toward the upper surface of the stage 42. The head unit 34 is moved in the horizontal direction along a movement path shown in FIG. 13 by the head unit moving mechanism. As a result, the melted resin material 12 is laminated on the upper surface of the stage 42, and the first resin layer 44 is formed.

After the formation of the first resin layer 44, an operation of adjusting the pressure inside the chamber 16 is performed in step S4.

Figure 11:
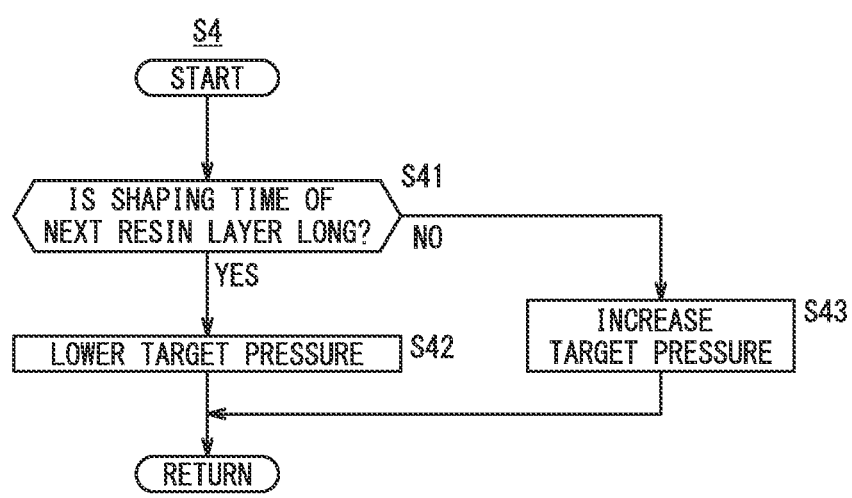
FIG. 11 is a flowchart showing details of step S4 of FIG. 10.

FIG. 11 shows details of step S4. In step S41 that constitutes step S4, the valve control unit 86 compares the shaping time tm of the previous resin layer 44 with the shaping time tm of the resin layer 44 to be formed next. In this case, the valve control unit 86 determines whether or not the shaping time tm of the next resin layer 44 becomes long.

When the shaping time tm becomes long (step S41: YES), the process proceeds to step S42. In step S42, the valve control unit 86 lowers the target pressure Pt by referring to the pressure profile to control opening and closing of the vacuum valve 22 and the atmospheric release valve 23. Specifically, a larger amount of gas is discharged from the chamber 16 by increasing the opening degree of the vacuum valve 22 in a state in which the atmospheric release valve 23 is closed. Thus, the gas in the chamber 16 is discharged to the outside through the vacuum valve 22 and the pump 24. As a result, the pressure in the chamber 16 decreases, and the effect of retaining the temperature in the chamber 16 increases.

On the other hand, in step S41, when the shaping time tm becomes short (step S41: NO), the process proceeds to step S43. In step S43, the valve control unit 86 increases the target pressures Pt by referring to the pressure profile to control opening and closing of the vacuum valve 22 and the atmospheric release valve 23. Specifically, the vacuum valve 22 is closed and the atmospheric release valve 23 is opened to supply outside air into the chamber 16. Alternatively, the opening degree of the vacuum valve 22 is reduced in a state in which the atmospheric release valve 23 is closed. Thus, the pressure in the chamber 16 increases. As a result, the effect of retaining the temperature in the chamber 16 is reduced.

In this way, the pressure in the chamber 16 is adjusted according to the shaping time tm. As a result, as shown in FIG. 14, the sub-layer temperature Ts can be maintained within a desired temperature range of Ts1 to Ts2 regardless of length of the shaping time tm (difference between the resin layers 44). In FIG. 14, the shaping time tm of the N-th resin layer 44 is relatively long. Further, the shaping time tm of the (N+1)-th and (N+2)-th resin layers 44 is relatively short.

Thereafter, in step S5, when the shaping work is continued (step S5: YES), the processes of steps S2 to S4 are repeatedly performed. In this case, the shaping process for the next resin layer 44 is executed in a state in which the stage 42 is lowered by a height of one layer by the stage moving mechanism.

When the shaping process for the uppermost resin layer 44 ends (step S5: NO), the three dimensional object 14 is completed.

A second example will be described with reference to FIGS. 15 to 18. In the second example, the pressure inside the chamber 16 (see FIG. 1) is adjusted by feedback control using the detected temperature Td detected by the temperature measurement unit 18. Therefore, in the second example, the profile creation unit 80 (see FIG. 3) serving as the feedforward control unit stops operating.

Figure 15:
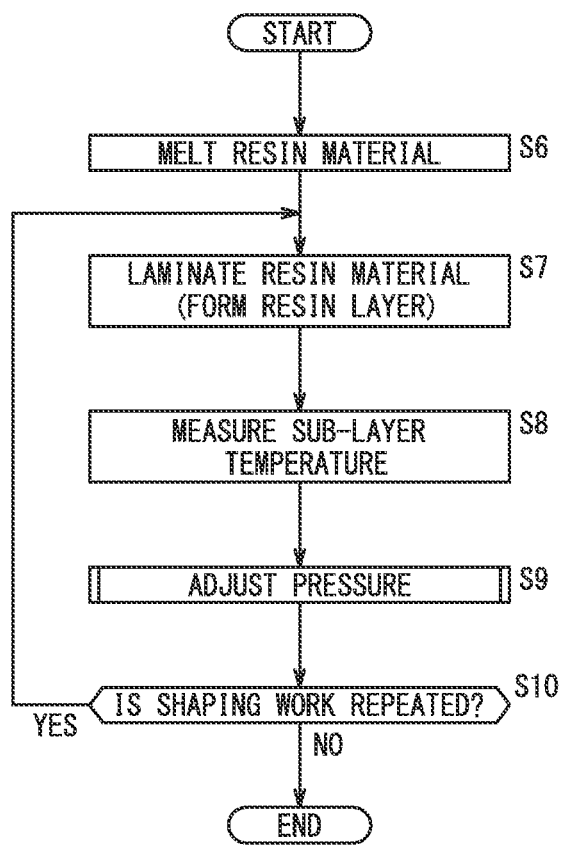
FIG. 15 is a flowchart showing the operation in a second example of the present embodiment.

In step S6 of FIG. 15, the heater 68 of the head unit 34 (see FIGS. 1 and 2) heats and melts the resin material 12, in the same manner as in step S2 of FIG. 10. In next step S7, the nozzle 64 of the head unit 34 ejects the melted resin material 12 toward the upper surface of the stage 42, in the same manner as in step S3 of FIG. 10. The head unit 34 is moved in the horizontal direction along a movement path shown in FIG. 17 by the head unit moving mechanism. As a result, the melted resin material 12 is laminated on the upper surface of the stage 42, and the first resin layer 44 is formed.

After the first resin layer 44 is formed, the temperature measurement unit 18 measures the surface temperature (sub-layer temperature Ts) of this resin layer 44 at the starting point of lamination in step S8. The measurement result of the sub-layer temperature Ts is input to the detected temperature input unit 76. In next step S9, the operation of adjusting the pressures in the chambers 16 is performed.

Figure 16:
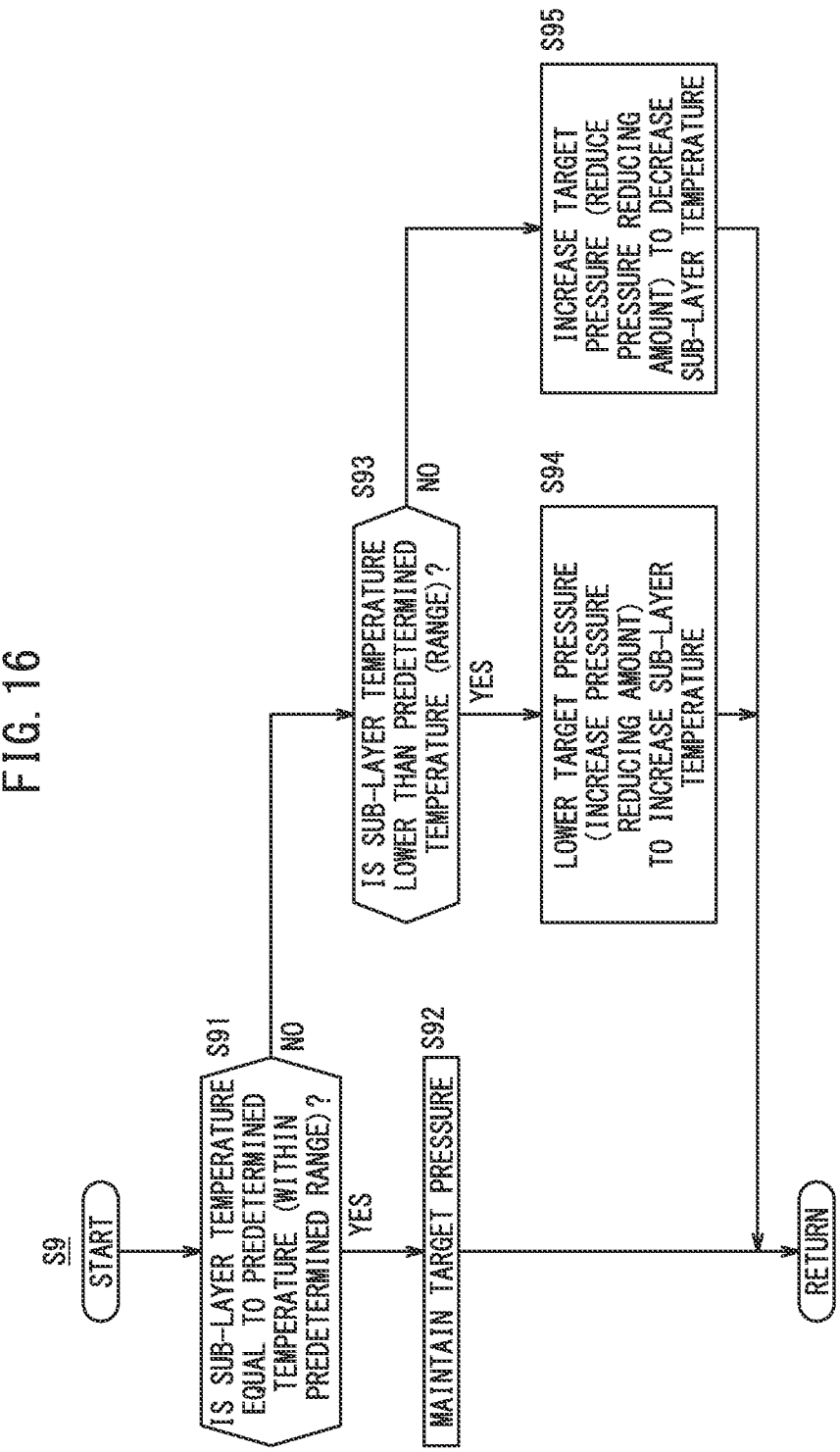
FIG. 16 is a flowchart showing details of step S9 of FIG. 15.
Figure 17:
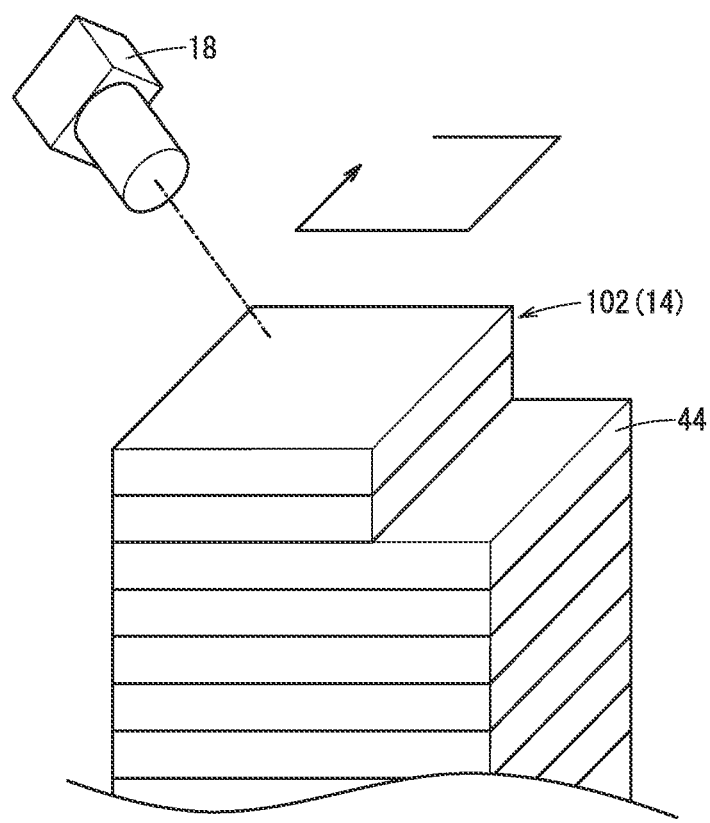
FIG. 17 is a schematic diagram showing a shaping direction of each resin layer.

FIG. 16 shows details of step S9. In step S91 that constitutes step S9, the feedback control unit 82 calculates a deviation between the target temperature and the sub-layer temperature Ts. The calculated deviation is output to the valve control unit 86 and the chamber control unit 26 via the addition unit 84 as a control amount of feedback control. The valve control unit 86 determines whether or not the sub-layer temperature Ts is the target temperature (within the predetermined temperature range) based on the input deviation.

When the sub-layer temperature Ts is the target temperature (within the predetermined temperature range) (step S91: YES), the process proceeds to step S92. In step S92, the valve control unit 86 determines to maintain the target pressure Pt. As a result, the valve control unit 86 maintains the opening degrees of the vacuum valve 22 and the atmospheric release valve 23.

In step S91, when the sub-layer temperature Ts is not the target temperature (out of the predetermined temperature range) (step S91: NO), the process proceeds to step S93. In step S93, the valve control unit 86 determines whether or not the sub-layer temperature Ts is lower than the target temperature (the predetermined temperature range).

When the sub-layer temperature Ts is lower than the target temperature (the predetermined temperature range) (step S93: YES), the process proceeds to step S94. In step S94, the valve control unit 86 controls opening and closing of the vacuum valve 22 and the atmospheric release valve 23 to lower the target pressure Pt. Specifically, the opening degree of the vacuum valve 22 is increased in a state in which the atmospheric release valve 23 is closed. As a result, the pressure inside the chamber 16 decreases, and the effect of retaining the temperature in the chamber 16 increases. Consequently, the sub-layer temperature Ts increases.

When the sub-layer temperature Ts is higher than the target temperature (the predetermined temperature range) (step S93: NO), the process proceeds to step S95. In step S95, the valve control unit 86 increases the target pressure Pt by controlling opening and closing of the vacuum valve 22 and the atmospheric release valve 23. Specifically, the vacuum valve 22 is closed and the atmospheric release valve 23 is opened to supply outside air into the chamber 16. Alternatively, the opening degree of the vacuum valve 22 is reduced in a state in which the atmospheric release valve 23 is closed. As a result, the pressure inside the chamber 16 increases, and the effect of retaining the temperature in the chamber 16 is reduced. Consequently, the sub-layer temperature Ts decreases.

Figure 18:
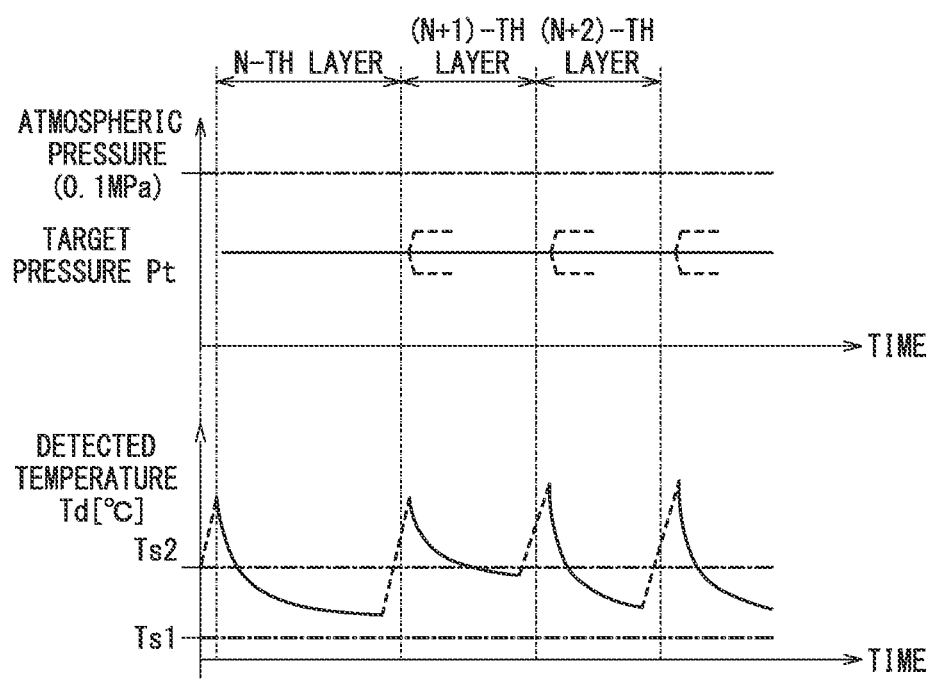
FIG. 18 is a timing chart showing a pressure profile and the surface temperature (detected temperature) of the workpiece over time.

In this manner, the pressure in the chamber 16 is adjusted according to the deviation between the sub-layer temperature Ts and the target temperature. As a result, as shown in FIG. 18, the sub-layer temperature Ts can be maintained within a desired temperature range of Ts1 to Ts2 regardless of length of the shaping time tm (difference between the resin layers 44). Also in FIG. 18, the shaping time tm of the N-th resin layer 44 is relatively long. Further, the shaping time tm of the (N+1)-th and (N+2)-th resin layers 44 is relatively short.

Thereafter, in step S10, when the shaping work is continued (step S10: YES), the processes of steps S7 to S9 are repeatedly performed. In this case, the shaping process for the next resin layer 44 is executed in a state in which the stage 42 is lowered by a height of one layer by the stage moving mechanism.

When the shaping process for the uppermost resin layer 44 ends (step S10: NO), the three dimensional object 14 is completed.

A third example will be described with reference to FIGS. 19 to 21. In the third example, the pressure in the chamber 16 (see FIG. 1) is adjusted by using both the feedforward control of the first example (see FIGS. 10 to 14) and the feedback control of the second example (see FIGS. 15 to 18). In this case, the pressure profile is modified by the feedback control, and the pressure in the chamber 16 is adjusted using the pressure profile that has been modified.

Figure 19:
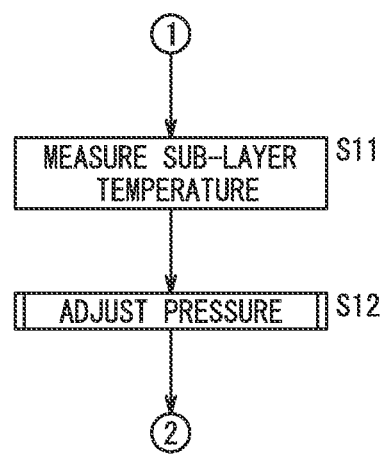
FIG. 19 is a flowchart showing a part of the operation in a third example of the present embodiment.

In the third example, after the processes of steps S1 to S3 of FIG. 10, the temperature measurement unit 18 measures the sub-layer temperature Ts of the formed resin layer 44 in step S11 of FIG. 19, in the same manner as in step S8 of FIG. 15. In next step S12, the operation of adjusting the pressure in the chamber 16 is performed.

Figure 20:
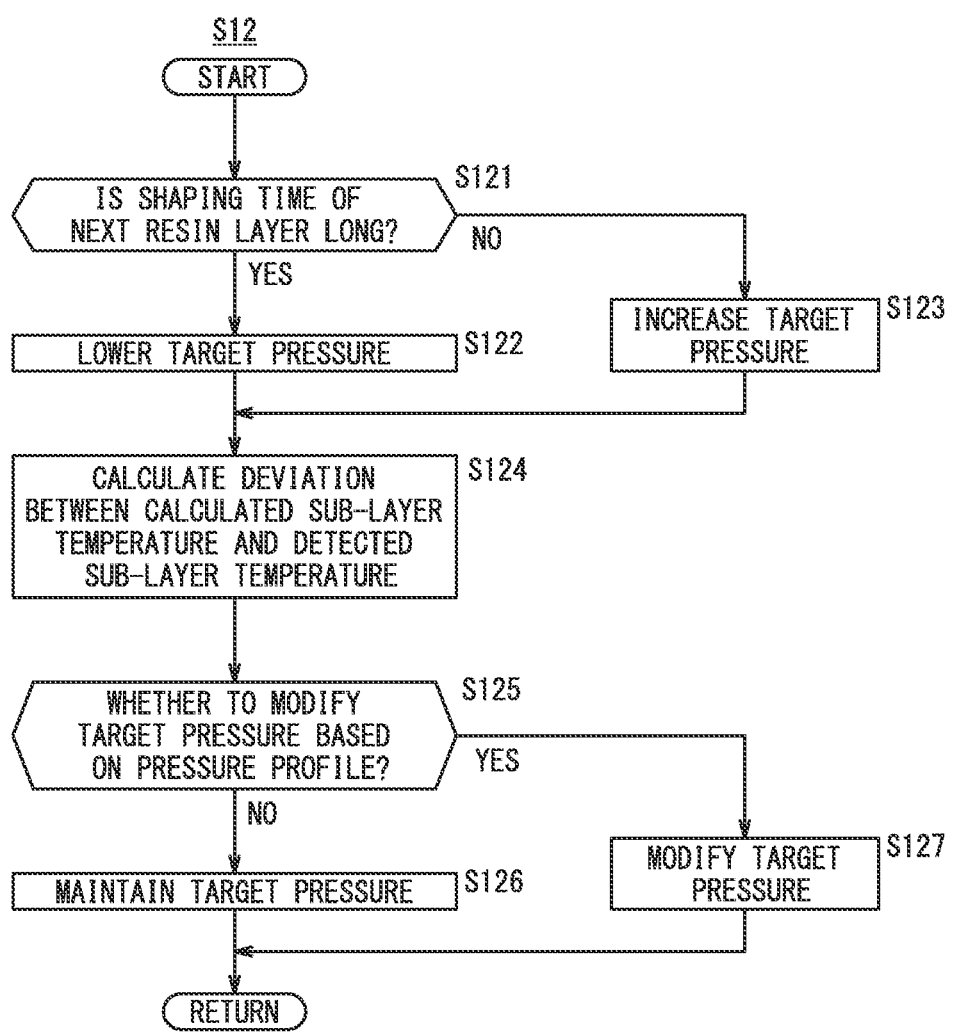
FIG. 20 is a flowchart showing details of step S12 of FIG. 19.
Figure 21:
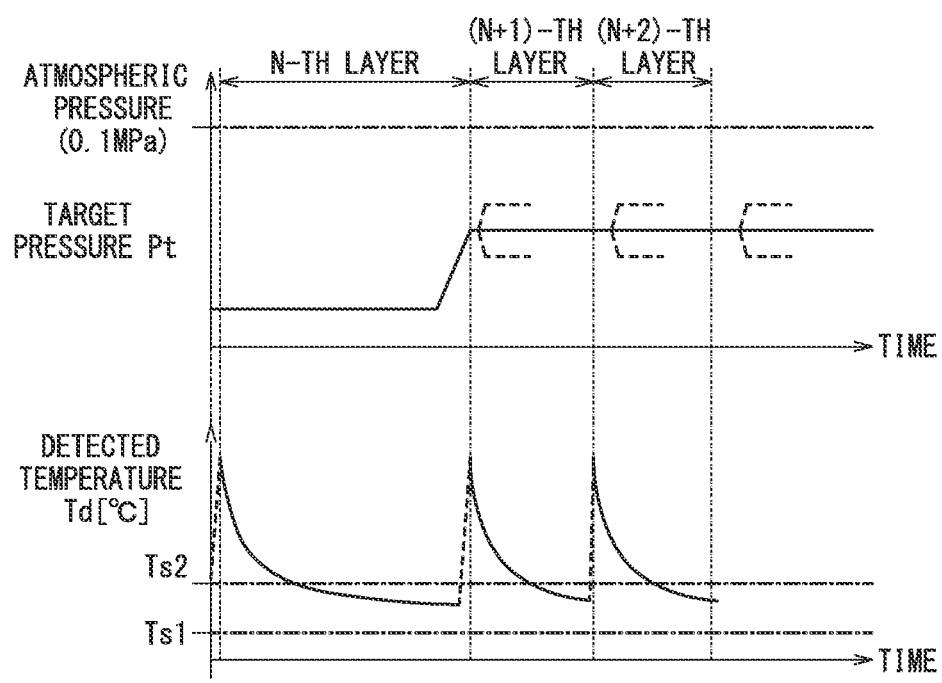
FIG. 21 is a timing chart showing a pressure profile and the surface temperature (detected temperature) of the workpiece over time.

FIG. 20 shows details of step S12. In step S121 that constitutes step S12, the valve control unit 86 (see FIG. 3) compares the shaping time tm of the previous resin layer 44 with the shaping time tm of the resin layer 44 to be formed next, and determines whether or not the shaping time tm becomes long, in the same manner as in step S41 of FIG. 11.

When the shaping time tm becomes long (step S121: YES), the process proceeds to step S122. In step S122, the valve control unit 86 determines to lower the target pressure Pt with reference to the pressure profile. On the other hand, in step S121, when the shaping time tm is short (step S121: NO), the process proceeds to step S123. In step S123, the valve control unit 86 determines to increase the target pressure Pt with reference to the pressure profile.

In step S124 after step S122 or step S123, the valve control unit 86 calculates a deviation between the sub-layer temperature Ts calculated by the sub-layer temperature calculation unit 88 and the sub-layer temperature Ts detected by the temperature measurement unit 18.

In next step S125, based on the calculated deviation, the valve control unit 86 determines whether or not to modify the target pressure Pt (pressure profile) that has been once determined in step S122 or S123.

When the calculated deviation is relatively small, the valve control unit 86 determines that it is not necessary to modify the pressure profile (step S125: NO). Next, in step S126, the valve control unit 86 fixes the target pressure Pt that has been once determined. As a result, the valve control unit 86 controls opening and closing of the vacuum valve 22 and the atmospheric release valve 23 in accordance with the target pressure Pt thus fixed. In FIG. 21, the solid line indicates the pressure profile used for control in step S126.

When the calculated deviation is relatively large, the valve control unit 86 determines that it is necessary to modify the pressure profile (step S125: YES). Next, in step S127, the valve control unit 86 modifies the target pressure Pt that has been once determined. Thus, the pressure profile obtained by the feedforward control is modified in consideration of the feedback control.

Accordingly, the valve control unit 86 controls opening and closing of the vacuum valve 22 and the atmospheric release valve 23 in accordance with the target pressure Pt based on the modified pressure profile. In FIG. 21, the modification of the pressure profile in step S127 is indicated by a dashed line.

As described above, in the third example, the pressure profile is modified, and the pressure in the chamber 16 is adjusted using the modified pressure profile. This makes it possible to appropriately correct the deviation between the sub-layer temperature Ts predicted by the feedforward control and the actual sub-layer temperature Ts. As a result, the pressure in the chamber 16 is adjusted with higher accuracy, and it is therefore possible to reliably maintain the sub-layer temperature Ts within a desired temperature range of Ts1 to Ts2.

Thereafter, in step S5 of FIG. 10, when the shaping work is continued (step S5: YES), the processes of steps S2, S3, S11, and S12 are repeatedly performed.

When the shaping process for the uppermost resin layer 44 ends (step S5: NO), the three dimensional object 14 is completed.

Figure 22:
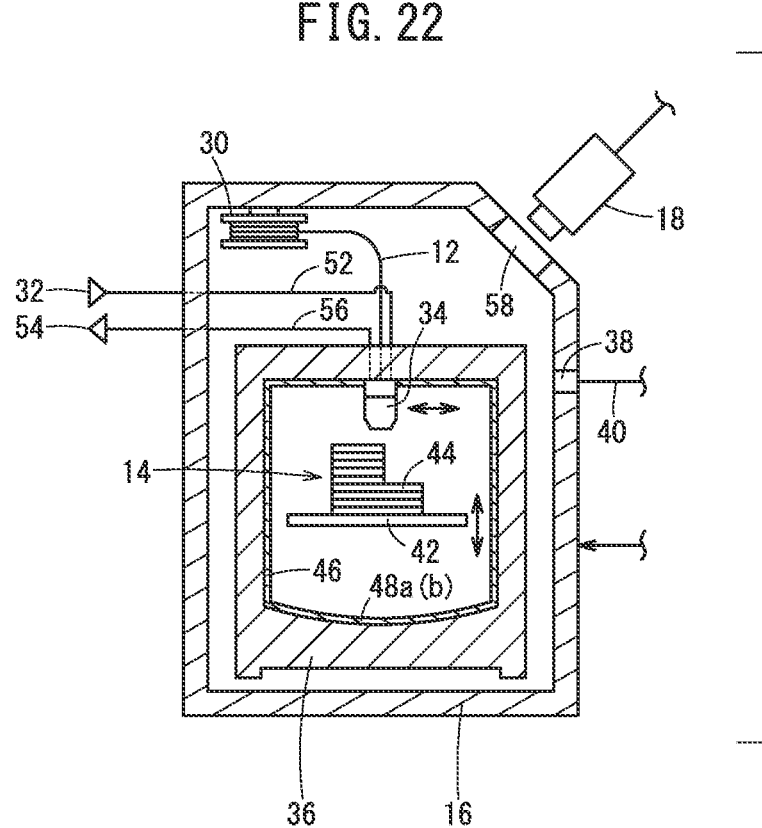
FIG. 22 is a partial configuration diagram showing a modified example of the present embodiment.

In the above description, the detection switch 50 is provided on the inner wall surface 46 of the housing 36. As shown in FIG. 22, when the temperature measurement unit 18 is an infrared thermal camera, the resin layer 44 can be imaged through the window 58 depending on the positions in which the infrared thermal camera and the window 58 are arranged. In this case, the detection switch 50 is not necessary. Accordingly, it is possible to measure the sub-layer temperature Ts while reducing the number of components of the three dimensional shaping apparatus 10 to reduce the cost.

The invention that can be grasped from the above embodiment will be described below.

A three dimensional shaping method for obtaining a three dimensional object (14) by laminating a resin material (12) having thermoplasticity comprises a melting step of melting the resin material, a laminating step of laminating the melted resin material in a chamber (16) to form a resin layer (44), and a pressure adjusting step of adjusting pressure in the chamber to maintain a temperature of the resin layer within a predetermined temperature range in the chamber.

In the present invention, the natural convection heat transfer coefficient is reduced by adjusting the pressure in the chamber to reduce the pressure in the chamber. This makes it possible to slow down the cooling rate of the resin layer when the resin layer is formed by laminating the melted resin material. As a result, the temperature of the resin layer laminated in the chamber can be maintained within the predetermined temperature range. In addition, it is possible to appropriately control the temperature of the resin layer, which is a workpiece. Therefore, residual stress generated in the three dimensional object is reduced. Further, the interlayer strength of the three dimensional object can be ensured.

The method further comprises a profile creating step of calculating a parameter (tm) related to shaping of each resin layer of the three dimensional object from model data (102) of the three dimensional object, predicting a temperature of the each resin layer after being shaped based on a relationship between an ambient pressure around the resin layer and a cooling rate of the resin layer, and creating a pressure profile indicating a temporal change of the pressure in the chamber, the pressure profile allowing the predicted temperature to be maintained within the predetermined temperature range. In the pressure adjusting step, the pressure in the chamber is adjusted based on the pressure profile.

In this manner, the pressure in the chamber is appropriately adjusted by performing feedforward control. As a result, the temperature of the resin layer can be appropriately maintained.

The method further comprises a temperature measuring step of measuring a sub-layer temperature (Ts) which is a surface temperature of the resin layer that has been formed, and in the pressure adjusting step, the pressure in the chamber is adjusted based on a relationship between an ambient pressure around the resin layer and a cooling rate of the resin layer to maintain the sub-layer temperature within the predetermined temperature range.

As described above, also when the feedback control is performed, the pressure in the chamber is appropriately adjusted. As a result, the temperature of the resin material can be appropriately maintained.

The method further comprises a temperature measuring step of measuring a sub-layer temperature which is a surface temperature of the resin layer that has been formed, and in the pressure adjusting step, the pressure profile is modified based on a difference between the predicted temperature and the sub-layer temperature, and the pressure in the chamber is adjusted based on the pressure profile that has been modified.

In this way, even if the temperature deviation due to the feedforward control is accumulated, the pressure in the chamber can be controlled more accurately by modifying the pressure profile by the feedback control.

A three dimensional shaping apparatus (10) that obtains a three dimensional object by laminating a resin material having thermoplasticity comprises a chamber, a head unit (34) disposed in the chamber and configured to melt the resin material and laminate the melted resin material in the chamber to form a resin layer, and a pressure adjustment unit (86) configured to adjust pressure in the chamber, wherein the pressure adjustment unit adjusts the pressure in the chamber to maintain a temperature of the resin layer within a predetermined temperature range in the chamber.

Also in this invention, the natural convection heat transfer coefficient can be reduced by adjusting the pressure in the chamber to reduce the pressure in the chamber. This makes it possible to slow down the cooling rate of the resin layer when the resin layer is formed by laminating the melted resin material. As a result, the temperature of the resin layer laminated in the chamber can be maintained within the predetermined temperature range. In addition, it is possible to appropriately control the temperature of the resin layer, which is a workpiece. Therefore, residual stress generated in the three dimensional object is reduced. Further, the interlayer strength of the three dimensional object can be ensured.

The three dimensional shaping apparatus further comprises a storage unit (100) configured to store model data of the three dimensional object and a relationship between an ambient pressure around the resin layer and a cooling rate of the resin layer, and a profile creation unit (80) configured to calculate, from the model data, a parameter related to shaping of each resin layer of the three dimensional object, predict a temperature of the each resin layer after being shaped based on the relationship between the ambient pressure and the cooling rate, and create a pressure profile indicating a temporal change of the pressure in the chamber, the pressure profile allowing the predicted temperature to be maintained within the predetermined temperature range, wherein the pressure adjustment unit adjusts the pressure in the chamber based on the pressure profile.

In this manner, the pressure in the chamber is appropriately adjusted by performing feedforward control. As a result, the temperature of the resin layer can be appropriately maintained.

The three dimensional shaping apparatus further comprises a storage unit configured to store a relationship between an ambient pressure around the resin layer and a cooling rate of the resin layer, and a temperature measurement unit (18) configured to measure a sub-layer temperature which is a surface temperature of the resin layer that has been formed, wherein the pressure adjustment unit adjusts the pressure in the chamber based on the relationship between the ambient pressure around the resin layer and the cooling rate of the resin layer to maintain the sub-layer temperature within the predetermined temperature range.

In this manner, also when the feedback control is performed, the pressure in the chamber is appropriately adjusted. As a result, the temperature of the resin material can be appropriately maintained.

The three dimensional shaping apparatus further comprises a temperature measurement unit configured to measure a sub-layer temperature which is a surface temperature of the resin layer that has been formed, wherein the pressure adjustment unit modifies the pressure profile based on a difference between the predicted temperature and the sub-layer temperature, and adjusts the pressure in the chamber based on the pressure profile that has been modified.

In this way, even if the temperature deviation due to the feedforward control is accumulated, the pressure in the chamber can be controlled more accurately by modifying the pressure profile by the feedback control.

The head unit includes a heater (68) configured to heat and melt the resin material, and a nozzle (64) configured to eject the melted resin material. In the head unit, a cooling flow path (74) is provided on an upstream side of the nozzle and the heater in an ejection direction of the resin material. The cooling flow path allows a coolant to be introduced from an outside of the chamber, allows an upstream side of the head unit in the ejection direction to be cooled by the coolant, and allows the coolant after cooling to be discharged to the outside of the chamber.

The head unit is disposed within the chamber. Therefore, when the inside of the chamber is in a reduced-pressure environment, it may be difficult to cool the upstream side of the head unit in the ejection direction. Therefore, a coolant is introduced from the outside via the cooling flow path and supplied to the upstream side of the head unit in the ejection direction. Accordingly, it is possible to avoid a situation in which the resin material is melted on the upstream side of the head unit in the ejection direction due to heat from the heater and the resin material is clogged in the nozzle.

The three dimensional shaping apparatus further comprises a housing (36) disposed within the chamber. A reflective paint (48a) is applied to an inner wall surface (46) of the housing, or metallic foil (48b) is attached to the inner wall surface of the housing, and the three dimensional object is formed in a predetermined area in the housing.

As a result, the three dimensional object can be favorably shaped while increasing the heat retaining effect.

Note that the present invention is not limited to the embodiment described above, and various configurations can be adopted without departing from the gist of the present invention.

What is claimed is:

1. A three dimensional shaping method for obtaining a three dimensional object by laminating a resin material having thermoplasticity, the three dimensional shaping method comprising:
   melting the resin material;
   laminating the melted resin material in a chamber to form a resin layer;
   calculating a parameter related to shaping of each resin layer of the three dimensional object from model data of the three dimensional object;
   predicting a temperature of each resin layer after being shaped based on a relationship between an ambient pressure around the resin layer and a cooling rate of the resin layer;
   creating a pressure profile indicating a temporal change of the pressure in the chamber, the pressure profile allowing a predicted temperature of each resin layer to be maintained within a predetermined temperature range; and
   adjusting pressure in the chamber to maintain the temperature of each resin layer within the predetermined temperature range in the chamber, wherein the pressure in the chamber is adjusted based on the pressure profile.

2. The three dimensional shaping method according to claim 1, further comprising
   measuring a sub-layer temperature which is a surface temperature of the resin layer that has been formed, wherein in the adjusting of the pressure, the pressure in the chamber is adjusted based on a relationship between the ambient pressure around the resin layer and the cooling rate of the resin layer to maintain the sub-layer temperature within the predetermined temperature range.

3. The three dimensional shaping method according to claim 1, further comprising
   measuring a sub-layer temperature which is a surface temperature of the resin layer that has been formed, wherein in the adjusting of the pressure, the pressure profile is modified based on a difference between the predicted temperature and the sub-layer temperature, and the pressure in the chamber is adjusted based on the pressure profile that has been modified.

4. A three dimensional shaping method for obtaining a three dimensional object by laminating a resin material having thermoplasticity, the three dimensional shaping method comprising:
   melting the resin material;
   laminating the melted resin material in a chamber to form a resin layer;
   adjusting pressure in the chamber to maintain a temperature of each resin layer within a predetermined temperature range in the chamber; and measuring a sub-layer temperature which is a surface temperature of the resin layer that has been formed, wherein in the adjusting of the pressure, the pressure in the chamber is adjusted based on a relationship between an ambient pressure around the resin layer and a cooling rate of the resin layer to maintain the sub-layer temperature within the predetermined temperature range.

5. A three dimensional shaping apparatus that obtains a three dimensional object by laminating a resin material having thermoplasticity, the three dimensional shaping apparatus comprising:
a chamber;
a head unit disposed in the chamber and configured to melt the resin material and laminate the melted resin material in the chamber to form a resin layer; and
a device comprising a processor and a memory that stores executable instructions that, when executed by the processor, facilitate performance of operations, comprising:
storing, by the device, model data of the three dimensional object and a relationship between an ambient pressure around the resin layer and a cooling rate of the resin layer;
calculating, by the device, from the model data, a parameter related to shaping of each resin layer of the three dimensional object;
predicting, by the device, a temperature of each resin layer after being shaped based on the relationship between the ambient pressure in the chamber and the cooling rate;
creating, by the device, a pressure profile indicating a temporal change of the pressure in the chamber, the pressure profile allowing the predicted temperature to be maintained within a predetermined temperature range, wherein the device adjusts the pressure in the chamber based on the pressure profile; and
adjusting, by the device, the pressure in the chamber, wherein the pressure in the chamber is adjusted to maintain the temperature of the resin layer within the predetermined temperature range in the chamber.

6. The three dimensional shaping apparatus according to claim 5, further comprising:
measuring, by the device, a sub-layer temperature which is a surface temperature of the resin layer that has been formed, wherein the pressure in the chamber is further adjusted based on the relationship between the ambient pressure around the resin layer and the cooling rate of the resin layer to maintain the sub-layer temperature within the predetermined temperature range.

7. The three dimensional shaping apparatus according to claim 5, further comprising
measuring, by the device, a sub-layer temperature which is a surface temperature of the resin layer that has been formed, and modifying, by the device, the pressure profile based on a difference between the predicted temperature and the sub-layer temperature, wherein
the pressure in the chamber is further adjusted based on the pressure profile that has been modified.

8. The three dimensional shaping apparatus according to claim 5, wherein the head unit includes
a heater configured to heat and melt the resin material, and
a nozzle configured to eject the melted resin material, in the head unit, a cooling flow path is provided on an upstream side of the nozzle and the heater in an ejection direction of the resin material, and
the cooling flow path allows a coolant to be introduced from an outside of the chamber, allows an upstream side of the head unit in the ejection direction to be cooled by the coolant, and allows the coolant after cooling to be discharged to the outside of the chamber.

9. The three dimensional shaping apparatus according to claim 5, further comprising
a housing disposed within the chamber, wherein a reflective paint is applied to an inner wall surface of the housing or metallic foil is attached to the inner wall surface of the housing, and the three dimensional object is formed in a predetermined area in the housing.

10. A three dimensional shaping apparatus that obtains a three dimensional object by laminating a resin material having thermoplasticity, the three dimensional shaping apparatus comprising:
a chamber;
a head unit disposed in the chamber and configured to melt the resin material and laminate the melted resin material in the chamber to form a resin layer; and
a device comprising a processor and a memory that stores executable instructions that, when executed by the processor, facilitate performance of operations, comprising:
storing, by the device, a relationship between an ambient pressure around the resin layer and a cooling rate of the resin layer;
adjusting, by the device, a pressure in the chamber, wherein the pressure in the chamber is adjusted to maintain a temperature of the resin layer within a predetermined temperature range in the chamber; and
measuring, by the device, a sub-layer temperature which is a surface temperature of the resin layer that has been formed,
wherein the pressure in the chamber is further adjusted based on the relationship between the ambient pressure around the resin layer and the cooling rate of the resin layer to maintain the sub-layer temperature within the predetermined temperature range.

* * * * *